UNITED STATES PATENT OFFICE.

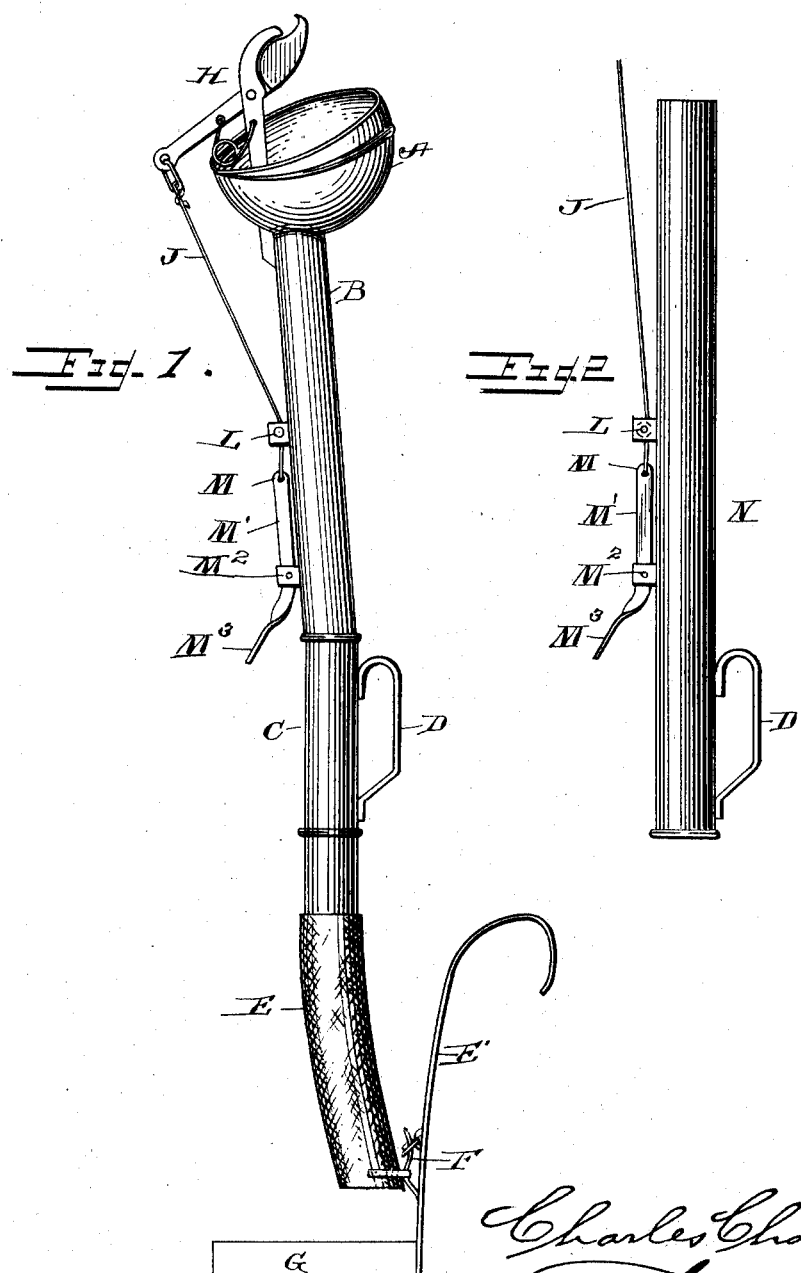

CHARLES CHARNOPH, OF OMAHA, NEBRASKA.

FRUIT-PICKER.

1,390,760.  Specification of Letters Patent.  Patented Sept. 13, 1921.

Application filed January 23, 1918. Serial No. 213,301.

*To all whom it may concern:*

Be it known that I, CHARLES CHARNOPH, a citizen of the United States, residing at Omaha, in the county of Douglas and State of Nebraska, have invented certain new and useful Improvements in Fruit-Pickers, of which the following is a specification.

My invention relates to improvements in fruit-pickers and the object is the provision of a device of this character which will quickly cut the fruit from the stem and deposit it carefully in a basket or receptacle carried by the person, and which device will possess merit in point of simplicity, cheapness and durability, and prove practical and efficient in every particular.

With this object in view, my invention consists of a fruit picker embodying novel features of construction and combination of parts for service, substantially as shown, described and particularly pointed out in the claims.

Figure 1 represents a side elevation of a complete fruit picker constructed in accordance with and embodying my invention, and Fig. 2 represents a side elevation of the main conveying tube or chute of my device.

In the drawings:

The character A designates a substantially hemispherical catch bowl or receptacle into which the fruit falls after being clipped or cut from the branch by a cutting mechanism H. From the bottom of the bowl leads a rigid metal tube B of considerable length having a detachable metallic tubular section C removably fitted on its lower end to form a continuation thereof and to increase its length, it being understood that the tube B acts as the delivery chute for the fruit to pass from the bowl, as well as the total supporting means for the bowl and the cutting means H. To this end, and to facilitate the manipulation of the picker, a suitable handle D is secured to the section C.

The fruit passing down the chute is to be received in a suitable basket or receptacle supported on a platform G secured to a suitable harness E' adapted to be placed over the shoulders of the operator. To prevent bruising or injury to the fruit as it leaves the chute into the basket a flexible discharge section E, made of a suitable cloth material or the like, is removably secured to the lower end of the chute section C and forming a continuation of the latter, the lower end of the section E extending within the basket. It is to be understood that the form of the harness hereinbefore shown and described is not essential to the form of picker herein shown, as any form of harness may be used. However, it is desirable to have the lower end portion of the section E fastened to the harness by suitable means F, such as the strap and buckle arrangement shown in the drawings.

Secured to the upper edge of the bowl A is a knife blade 1 having pivotally secured thereto a coöperating blade 2, the cutting edges of the blade being normally held apart by a suitable spring 3. It will be observed that the knife blade forming the cutting means H extends well above the bowl in order that the operator may see the manner in which the picking operation is being performed. The extremities of the cutting edges of the blades are inturned toward each other so that the stems of the fruit will not slide off of the cutting edge during the operation in a manner which will be readily understood. The other end portion of the blade 2 has an operating cord J secured thereto which passes down alongside the tube B over a guide pin L and is connected to the upper end M of a pivoted actuating lever M', which is fulcrumed at $M^2$, and is further provided on its opposite end with a finger grasping portion $M^3$. It will be observed that the handle portion D of the picker and that the finger grasping portion M' are positioned in proximity of each other and on opposite sides of the tube section C, in order that only one hand of the operator is necessary to hold and operate the picker, the one hand and fingers grasping the handle portion D while the thumb of the hand may engage the portion $M^3$ of the operating lever. Obviously, as the portion $M^3$ is depressed by the thumb the cord J will be pulled upon and the cutting edges of the blades 1 and 2 brought together.

From the above it will be seen that only one hand of the operator is necessary to operate the picker and that the delivery chute from the bowl A also acts as the support for the bowl during the picking operation. The device is extremely simple and cheap to manufacture and most efficient in operation.

The construction shown in Fig. 2 is the same in all particulars as the construction above referred to, with the exception that the chute or tube N is vertical throughout its length.

I claim:

1. A fruit picker comprising a semispherical bowl, a chute leading from said bowl consisting of a rigid tubular member, a handle portion at the lower end of said tubular member, and a flexible tubular member secured to the lower end of the rigid tubular member and forming a continuation of the same, cutting means adjacent the upper edge of the bowl, a lever pivoted to the rigid tubular member, and a connection between said lever and the cutting means, whereby the latter is operated.

2. A fruit picker comprising a substantially semispherical bowl, a chute leading from the bowl from a point thereof at one side of the axial center of the bowl, said chute consisting of a rigid tubular member communicating with the bowl, a handle portion at the lower end of said chute, cutting means mounted adjacent the upper edge of the bowl nearest said chute, a lever fixed to said tubular member, and a connection between said lever and said cutting means, whereby the latter may be operated.

In testimony whereof I affix my signature in the presence of two witnesses.

CHARLES CHARNOPH.

Witnesses:
J. W. MARTIN,
J. M. CLIFFORD.